United States Patent [19]

Gruchalla et al.

[11] Patent Number: 4,591,941
[45] Date of Patent: May 27, 1986

[54] DOUBLE INSULATED PROTECTED SYSTEM PROVIDING ELECTRICAL SAFETY AND INSTRUMENTATION QUALITY POWER GROUNDING

[75] Inventors: Michael E. Gruchalla; David C. Koller, both of Albuquerque, N. Mex.

[73] Assignee: EG&G Washington Analytical Services Center Inc., Albuquerque, N. Mex.

[21] Appl. No.: 534,205

[22] Filed: Sep. 21, 1983

[51] Int. Cl.⁴ ............................................. H02H 3/00
[52] U.S. Cl. ........................................ 361/42; 361/35; 361/47; 336/84 C; 324/51; 307/326
[58] Field of Search ................... 361/1, 43, 42, 35, 36, 361/47–50; 323/361, 911, 355; 336/84 C; 174/5 R, 5 SG; 324/54; 330/185, 188, 190; 333/17 R, 17 L, 17 M, 177, 178; 307/326, 327; 128/908, 419 PS, 419 PT, 901; 320/4

[56] References Cited

U.S. PATENT DOCUMENTS

| | | | |
|---|---|---|---|
| 2,079,636 | 5/1937 | Sharp | 361/49 |
| 2,697,217 | 12/1954 | Jeffers | 361/42 X |
| 3,196,316 | 7/1965 | Crom | 361/48 |
| 3,690,313 | 9/1972 | Weppner et al. | 361/42 X |
| 3,781,927 | 1/1974 | Zakaras | 307/326 |
| 3,783,340 | 1/1974 | Becker | 324/51 X |
| 3,978,465 | 8/1976 | Goode | 361/42 X |
| 4,023,070 | 5/1977 | McCrory | 361/43 |
| 4,112,354 | 9/1978 | Bahder et al. | 324/54 |
| 4,140,965 | 2/1979 | Neal | 324/54 |
| 4,159,501 | 6/1979 | White | 361/42 X |
| 4,188,574 | 2/1980 | Allington | 324/51 |
| 4,392,173 | 7/1983 | Rubin | 361/35 |

Primary Examiner—A. D. Pellinen
Assistant Examiner—Derek S. Jennings
Attorney, Agent, or Firm—Finnegan, Henderson, Farabow, Garrett & Dunner

[57] ABSTRACT

A double insulating protected system for use in coupling an instrumentation system to a remote power source so as to test an experimental system without posing life-threatening hazards. Connection between the instrumentation system and power source is accomplished by a pair of cascaded isolating transformers, with the connections between the two transformers being inaccessable, such as by a separate housing. The instrumentation system equipment ground is coupled to the experimental system equipment ground via a drain conductor so as to reference the former system to the same potential as that of the latter. The system provides a double insulation system such that a primary-to-secondary, primary-to-frame, or secondary-to-frame fault occurring in either of the transformers, or similar faults in the instrumentation system, will not result in a life-threatening situation to the system user.

8 Claims, 3 Drawing Figures

DOUBLE INSULATED PROTECTED SYSTEM PROVIDING ELECTRICAL SAFETY AND INSTRUMENTATION QUALITY POWER GROUNDING

BACKGROUND OF THE INVENTION

I. Scope of the Invention

The present invention relates to the field of electronic instrumentation and AC power distribution grounding. More particularly, the present invention relates to a system for providing electrical safety and instrumentation quality AC power grounding by means of double insulation.

II. The Prior Art

In large volume experimental systems, such as large laboratories or in the case of field testing, test instrumentation is often located some distance from either the experiment being observed or a source of power. In many applications, such as mobile vans, it is virtually impossible to assure that the equipment grounds of the experiment and of the instrumentation AC power source are equipotential. Many pieces of equipment, whether test instrumentation or part of the experiment system, have their input signals referenced to their chassis, i.e., equipment ground. Thus, if high data quality is to be preserved, the experiment and instrumentation equipment grounds must both be at the same potential.

In typical prior art power distribution systems, power for a plurality of services, including both the experiment and instrumentation systems, is derived from a single power source. FIG. 1 shows such a power distribution system. The currents which flow in a neutral connection N between Bond 1 and Bond 3 produce potentials between the equipment grounds of the experiment and the instrumentation. If a shielded cable is connected between the experiment and the instrumentation, an AC power current will flow in the shield, thus producing AC power noise in the data. Such noise can be as high as several hundred millivolts upwards to several volts as compared to typical experimental data which is often as low as one millivolt. Such noise is therefore unacceptable.

One solution to eliminate the AC power noise is to break the neutral-to-equipment ground connection at Bond 3, allowing the instrumentation equipment ground to float. An external ground conductor, i.e. external to the power distribution wiring, may then be run between the instrumentation grounds. However, this results in a potentially life-threatening configuration. For example, the external ground wire is an uncontrolled conductor in that it may be accidentally broken independently of other AC power conductors. Further, since it is not considered an AC power conductor, there is no assurance that such an external ground wire can handle a full service fault.

If a hot-to-equipment ground fault occurs and the ground conductor has been disconnected, the full line potential will appear between the instrumentation equipment ground and that of the experiment. If a technician, under this condition, attempts to attach the ground conductor or data cable and comes in contact with both the instrumentation and experiment grounds, the resulting shock could be lethal. Even if the ground conductor is intact at the time of a fault, the conductor could be fused open if it is of insufficient size to handle the fault. In such a case, a technician attempting to attach a shielded data cable between the experiment and instrumentation could experience a lethal shock. For these reasons, running of a separate grounding conductor in lieu of the AC power equipment ground conductor is an unsafe practice.

This problem may be somewhat solved if an equipment ground conductor and all other AC power conductors are run from Bond 1 of the experimental volume to the instrumentation with no neutral-to-ground bond at the instrumentation. This configuration, termed a feeder, is shown in FIG. 2. The principal problem encountered with a feeder in instrumentation systems is due to the type of power line filters normally used. Such filters may cause currents on the order of several amperes to flow in the equipment ground, rather than in the neutral conductor. Such currents also cause a difference between the potentials of the experiment and instrumentation equipment grounds resulting in noise in the instrumentation and possibly an unsafe situation.

If an isolating transformer T is added to the feeder, as shown in FIG. 2, and a service derived at the instrumentation equipment ground, then filter displacement currents are allowed to flow in the neutral conductor with no current being present on the equipment ground conductor. This type of power distribution system is safe but, in practice, it is often impossible to obtain a feeder from the experiment AC power system in the manner shown in FIG. 2. Consequently, the equipment grounds of the experiment and instrumentation systems are rarely equipotential in actuality. While this problem may be solved by breaking the equipment ground path from the isolating transformer T to the instrumentation system and adding an external ground conductor from the instrumentation system to experimental volume ground, this reintroduces the hazards discussed above. For example, a primary-to-secondary fault in windings of the the isolating transformer T would produce a life-threatening situation if the external ground path were to be broken.

Thus, a problem exists in the art of providing both AC power to an instrumentation system and referencing that system to the ground of an experimental volume so that accurate test data may be achieved without threat of hazardous shock.

SUMMARY OF THE INVENTION

Accordingly, it is an object of the invention to provide a system for delivering AC power to an instrumentation system from a remote power source.

It is another object of the present invention to reference the ground of an instrumentation system to that of an experimental system so that accurate test results may be achieved, yet without presenting any hazards to technicians operating the instrumentation system. No single fault will cause an unsafe condition.

Additional objects and advantages of the present invention will be set forth in part from the description that follows and, in part, will be obvious from the description or may be learned by practice of the invention. The objects and advantages of the invention may be realized and obtained by the methods and apparatus particularly pointed out in the appended claims.

The present invention achieves the objects set forth above by means of a double insulation arrangement. In such an arrangement, an insulation system comprising basic insulation and supplementary insulation is provided, with the two insulations physically separated and arranged so that they are not simultaneously subjected to the same deteriorating influences to the same degree.

Specifically, to achieve the objects and in accordance with the purposes of the invention, as broadly described herein, a double insulated protected system for coupling an instrumentation system to a remote power source having power terminals and a ground terminal for use in testing an experimental system comprises: a first isolating transformer having primary and secondary windings formed about a core, the primary winding being coupled to the power terminals of the remote power source and the core being coupled to said ground terminal; a second isolating transformer having primary and secondary windings formed about a core, the primary winding of the second transformer being coupled to the secondary winding of the first transformer, and the instrumentation system being coupled to the secondary winding and core of the second transformer; a drain conductor coupling the instrumentation system to the experimental system for referencing the instrumentation system to the experimental system; and insulating means coupled to the first and second transformers for rendering inaccessable connections between the transformers.

The accompanying drawings, which are incorporated in and constitute a part of the specification, illustrate a presently preferred embodiment of the invention and, together with the description, serve to explain the principles of the invention.

DESCRIPTION OF THE PREFERRED EMBODIMENT

Figure 1:
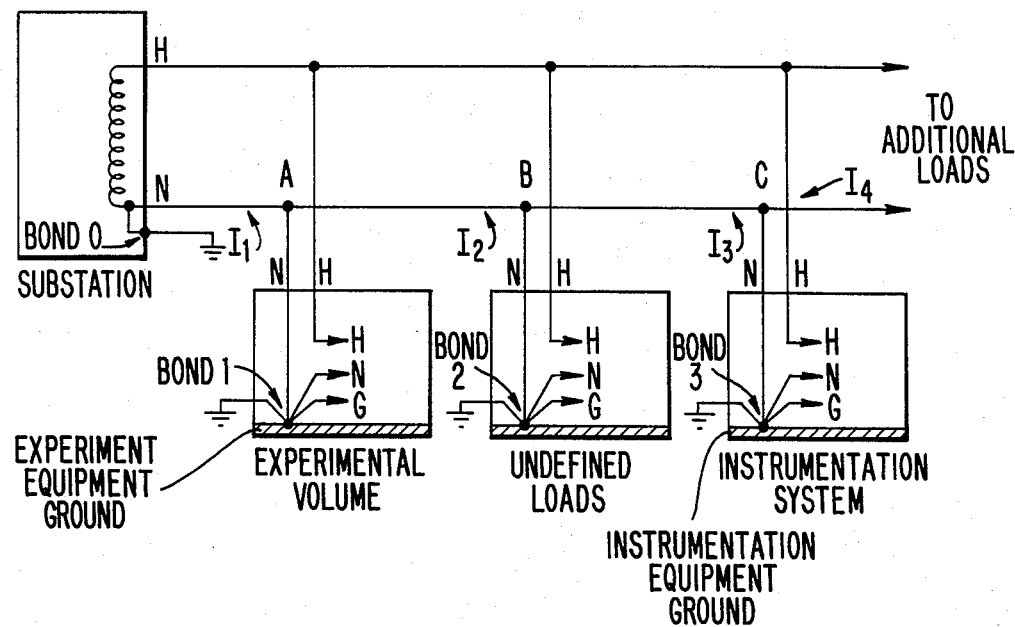
FIG. 1 is a schematic diagram showing a prior art power distribution system in which power for experimental and instrumentation systems is derived from a common source.
Figure 2:
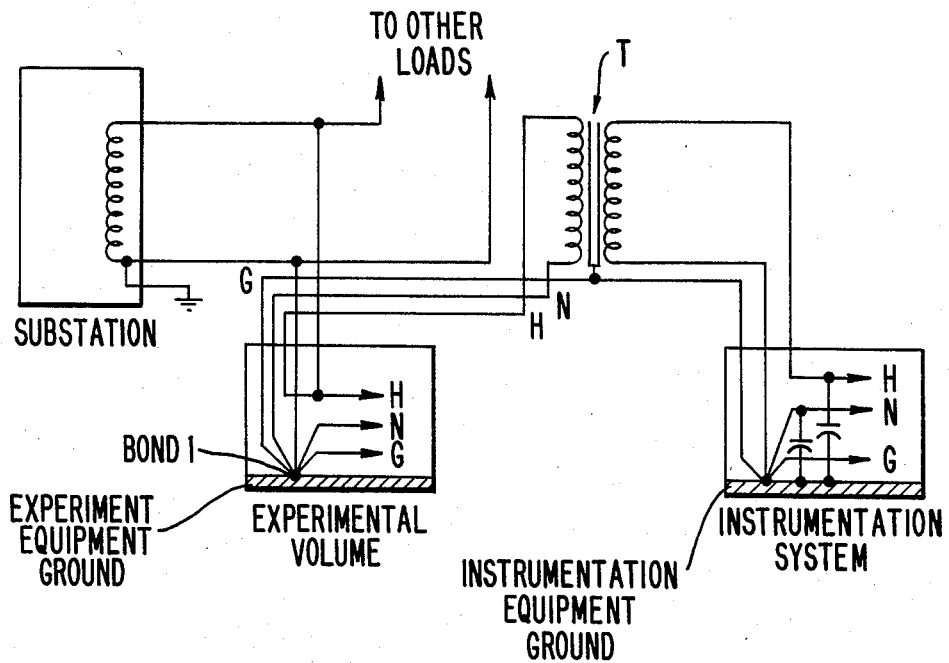
FIG. 2 is a schematic diagram showing a prior art feeder distribution system including transformer isolation of filter displacement currents.
Figure 3:
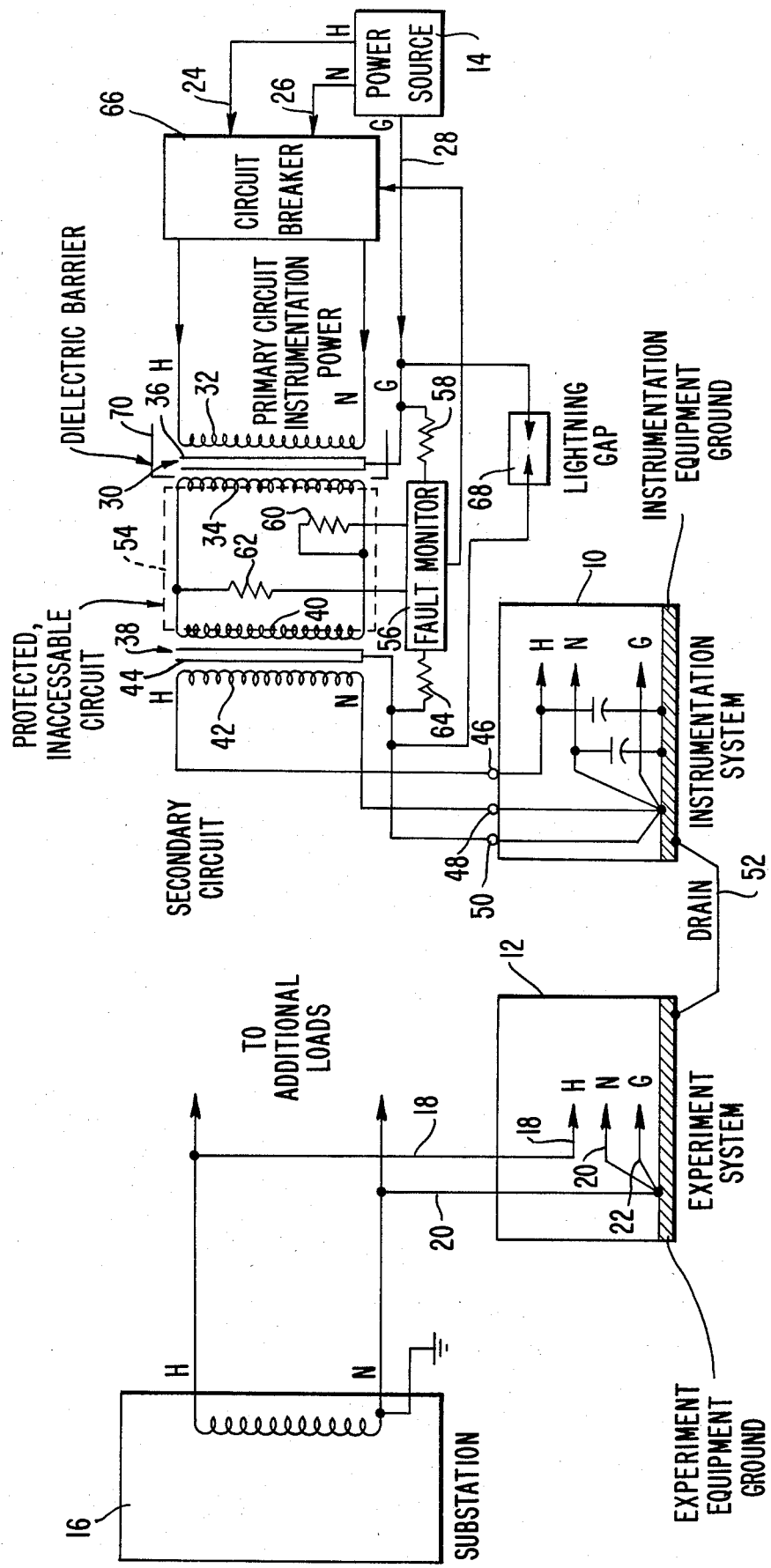
FIG. 3 is a schematic diagram showing a double insulated protected system according to the present invention.

Reference will now be made in detail to a presently preferred embodiment of the invention, an example of which is illustrated in FIG. 3. A protected system according to the present invention is for use in coupling an instrumentation system 10 with an experimental system 12, the former being powered from a remote power source 14 while the latter is powered from a different power source, such as substation 16. Instrumentation system 10 comprises test equipment, such as oscilloscopes, signal generators, VTVM and the like, used in testing experiment system 12. For example, experimental system 12 may be a power transformer coupled to an electrical substation 16 and instrumentation system 10 may comprise a mobile van containing test equipment.

As shown in FIG. 3, experiment system 12 is coupled to substation 16 in a known fashion involving connections carrying high voltage 18, neutral 20 and ground 22. Ground 22 is also referred to as the "experiment equipment ground" and would include, in the above example, the power transformer casing.

The precise manner in which instrumentation system 10 is coupled to remote power source 14 is described hereinbelow. However, it is noted that remote power source 14 includes power terminals 24 and 26, and ground terminal 28. The remote power source may comprise any one of many well-known designs such as AC power means or an auxilliary generator or the like.

According to the present invention, a first isolating transformer having primary and secondary windings formed about a core is provided, the primary winding being coupled to the power terminals of the remote power source and the core being coupled to the ground terminal. As embodied herein, the first isolating transformer comprises transformer 30 having a primary 32, a secondary 34 and a core 36. The primary 32 is coupled to remote power source 14 via power terminals 24 and 26, and core 36 is coupled to ground terminal 28. The construction of transformers of this type is well-known in the art and need not be described in further detail for purposes of the present invention.

Also according to the invention, a second isolating transformer is provided having primary and secondary windings formed about a core, said primary winding of the second transformer being coupled to the secondary winding of the first transformer, and the instrumentation system being coupled to the secondary winding and core of the second transformer. As embodied herein, the secondary isolating transformer includes transformer 38 having a primary winding 40, a secondary winding 42 and a core 44. Primary winding 40 is coupled to secondary winding 34 of the first transformer 30, while secondary winding 42 is coupled to instrumentation system 10 via instrumentation power terminals 46 and 48. Core 44 of transformer 38 is coupled to the ground terminal 50 of instrumentation system 10. Transformer 38 is preferably of construction similar to that of transformer 30, and is also well-known in the art.

According to the present invention, a drain conductor is provided coupling the instrumentation system to the experimental system for referencing the instrumentation system to the experimental system. As embodied herein, the drain conductor is identified by reference character 52 and is shown as coupling the instrumentation equipment ground 50 to the experimental system equipment ground 22. According to a preferred embodiment, drain 52 may comprise the shield portion of a coaxial cable (not shown) used to carry data from the experiment system to the instrumentation system. Alternately, drain 52 may be provided via a separate conductor, such as a copper or aluminum wire, preferably of a reasonably large cross-sectional dimension at least equal to the size of the primary service conductors used to power the instrumentation system.

It is important to note that drain conductor 52 is intended to reference the ground of instrumentation system 10 to that of experimental system 12 so as to enable accurate test data to be gathered. Drain conductor 52 is not intended to provide any equipment grounding function and, thus, is not a "ground" in the conventional sense. Further, it is not intended to be a current-carrying conductor since any current which flows in drain conductor 52 will cause a potential difference between the instrumentation and experimental system grounds and will compromise acquisition of accurate data. It should also be appreciated that the drain conductor principally serves to reference the instrumentation and experimental system grounds, whereas the safety measures discussed herein are principally achieved via the double insulation and cascaded transformers.

According to the present invention, insulating means are provided coupled to the first and second transformers for rendering inaccessable connections between the transformers. As embodied herein, the insulating means is identified by reference character 54. Insulating means 54 serves to isolate the connections between transformers 30 and 38, and may comprise a sealed container, such as a utility box or conduit pipe, which prevents access to the connections between the two transformers. In the case of a mobile van, for example, transformers 30 and 38 would preferably be located at separate points within or on the van, with the connections between the two transformers being housed in the walls of the van; in such a case, the van walls would be construed as being insulating means 54. In keeping with the definition of "double insulation", it is important that the two transformers be physically separate so as not to be exposed to the same conditions.

Also according to a presently preferred embodiment, the invention includes fault monitoring means 56 coupled to first and second transformers 30 and 38 via high impedance paths 58, 60, 62 and 64. Preferably, a circuit breaker 66 is also provided coupled between remote power source 14 and primary windings 32 of transformer 30. Circuit breaker 66 is coupled to fault monitor 56 so as to be actuated by the latter. Fault monitor 56 serves to detect failure of the protection system provided by the present invention, such as that due to a short circuit across the primary and secondary windings of either of transformers 30 and 38. Accordingly, fault monitor 56 may be a current sensing device of any well-known design suitable for detecting changes in a current flowing between at least two of its inputs, i.e. impedance paths 58, 60, 62 and 64. Upon detection of such an event fault monitor 56 causes circuit breaker 66 to open, thus terminating further application of power from remote source 14. This adds an extra measure of protection to a system constructed according to the present invention.

Further protection may also be provided by means of a lightning gap 68 coupled from ground terminal 28 and core 36 to ground terminal 50 and core 44. Lightning gap 68 serves to protect the insulation barriers of the protected system from damage due to static charging. Devices suitable for such purposes are wellknown in the art and need not be further described for purposes of the present invention.

Double insulation in the present invention is effected by the use of the two isolating transformers 30 and 38 in that the insulation in each transformer provides a one level of insulation. Making the circuits intermediate the two transformers inaccessable by insulating means 54 provides a supplemental level of insulation and protection. Accordingly, the connections of remote power source 14 to transformer 30 and of transformer 30 to transformer 38 are physically safeguarded so as to reduce the probability of a short occurring. As explained in detail hereinbelow, this renders a system according to the present invention free from life-threatening hazards.

In operation, power from remote power source 14 is delivered, in turn, to transformer 30, transformer 38 and then instrumentation system 10. Thus, the equipment comprising the instrumentation system may be operated in a convenient manner. In order to conduct tests on experimental system 12, probes or cables (not shown) may be connected from the equipment comprising instrumentation system 10 to various points within experimental system 12. The existence of drain conductor 52 ensures that the ground level of the equipment of instrumentation system 10 is referenced, i.e., equipotential, to that of experimental system 12. Thus, highly accurate test data may be obtained in due course.

The double insulating arrangement of the present invention simultaneously provides a high degree of safety to the system user. For example, the possibility of any fault occurring is greatly reduced by the physical inaccessability of the connections intermediate power source 14 and instrumentation system 10. Further, causing a fault across one of the primary-to-secondary windings of either of transformers 30 and 38 only causes a change in the grounding arrangement of the immediately affected transformer. That is, such a fault is isolated from either the instrumentation system or from the remote power source due to the presence of the other isolating transformer. A danger is presented only in the event that both transformers 30 and 38 are short circuited; however, this possibility is greatly reduced due to the insulating arrangement of the system and, further, such a double short would be detected by fault monitor 56 causing circuit breaker 66 to operate and render the circuit safe. In like fashion, the present invention provides protection from faults occurring between the transformer windings and the instrumentation system frame or transformer casing.

As stated above, transformers 30 and 38 are conventional units in which the windings are provided about a central core and are insulated by a dielectric barrier 70. These transformers may also be provided with multiple shielding arrangements together with the transformer core. Such transformers, however, provide little or no normal mode filtering such that normal mode noise between 10 Hz and 10 kHz may pass through the transformer with insufficient attenuation for good instrumentation applications. Thus, it may be preferable to supply additional electromagnetic interference filtering so as to reduce the normal mode noise. Fortunately, most test instruments used today have very good normal mode rejection and thus are capable of ignoring typical normal mode power line noise.

In view of the foregoing, the present invention may be summarized as a double insulating protected system for powering an instrumentation system from a remote power source so that the instrumentation system may safely be coupled to an experimental system. Referencing between the two systems is provided by a separate drain conductor, while double insulation is provided by means of a cascaded pair of isolating transformers between the remote power source and the instrumentation system with the interconnections between the transformers being inaccessible. To ensure the highest degree of safety, it is also recommended that all wiring within each of the aforementioned systems be in compliance with the standards set forth in the National Electric Code (NEC, 1981 edition).

It will be apparent to those skilled in the art that modifications and variations can be made in the double insulated protected system of the invention. The invention in its broader aspects is therefore not limited to the specific details, representative methods and apparatus, and illustrative examples shown and described herein above. Thus, it is intended that all matter contained in the foregoing description or shown in the accompanying drawings shall be interpreted as illustrative and not in a limiting sense.

What is claimed is:

1. A double insulated protected system for coupling an instrumentation system to a remote power source having power terminals and a ground terminal, for use in testing an experimental system, comprising:

a first isolating transformer having primary and secondary windings formed about a core, said primary winding being coupled to said power terminals of the remote power source, said core being coupled to said ground terminal, and said secondary winding being entirely decoupled from said ground terminal;

a second isolating transformer having primary and secondary windings formed about a core, said primary winding of said second transformer being coupled to said secondary winding of said first transformer and entirely decoupled from said ground terminal, and said instrumentation system being coupled to said secondary winding and core of said second transformer;

a drain conductor coupling said instrumentation system to said experimental system for referencing said instrumentation system to said experimental system; and insulating means coupled to said first and second transformers for rendering inaccessible connections between said transformers.

2. The protected system recited in claim 1 further comprising means coupled to said first and second transformers for monitoring the status of said insulating means such that all faults are detected.

3. The protected system recited in claim 2 further comprising a circuit breaker coupled to said first transformer and to said monitoring means for intercepting supply of power from said remote power source to said first transformer.

4. The protected system in claim 1 wherein said first transformer includes a dielectric barrier physically separating said insulating means from said remote power source.

5. A double insulated protected system for coupling to a remote power source having first and second power terminals and a source ground terminal, comprising:

an instrumentation system including test equipment having third and fourth power terminals and an instrumentation ground terminal;

an experimental system to be tested, including an experimental ground terminal;

a first isolating transformer having primary and secondary windings formed about a core, said primary winding being coupled to said first and second power terminals of the remote power source, said core being coupled to said source ground terminal, and said secondary winding being entirely decoupled from said source ground terminal;

a second isolating transformer having primary and secondary windings formed about a core, said primary winding of said second transformer being coupled to said secondary winding of said first transformer and entirely decoupled from said source ground terminal and from said instrumentation ground terminal, said third and fourth power terminals of said instrumentation system being coupled to said secondary winding of said second transformer, and said instrumentation ground terminal being coupled to said core of said second transformer;

a drain conductor coupling said instrumentation ground terminal to said experimental ground terminal for referencing said test equipment to said experimental system; and insulating means coupled to said first and second transformers for rendering inaccessible connections between said first and second transformers.

6. The protected system recited in claim 5 further comprising means coupled to said primary and secondary windings and to said core of each of said first and second transformers for monitoring the status of said insulating means such that faults are detected.

7. The protected system recited in claim 6 further comprising a circuit breaker coupled to said primary winding of said first transformer and to said monitoring means for intercepting supply of power from said first and second power terminals of said remote power source to said first transformer.

8. The protected system recited in claim 5 wherein said first transformer includes a dielectric barrier physically separating said insulating means from said remote power source.

* * * * *